(12) United States Patent
Chen et al.

(10) Patent No.: US 7,365,971 B2
(45) Date of Patent: Apr. 29, 2008

(54) MOUNTING MECHANISM FOR STORAGE DEVICE

(75) Inventors: Yun-Lung Chen, Tu-Cheng (TW); Yan-Xi Yang, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 441 days.

(21) Appl. No.: 11/019,800

(22) Filed: Dec. 21, 2004

(65) Prior Publication Data

US 2005/0185373 A1 Aug. 25, 2005

(30) Foreign Application Priority Data

Feb. 20, 2004 (TW) .............................. 93202457 U

(51) Int. Cl.
*H05K 5/00* (2006.01)
*A47F 5/00* (2006.01)
*G11B 5/012* (2006.01)

(52) U.S. Cl. ...................... 361/685; 361/679; 361/686; 248/298.1; 312/223.1; 360/97.01; 360/98.01

(58) Field of Classification Search ................ 361/679, 361/685, 686; 360/97.01, 98.01, 137, 137 D; 312/223.1–223; 248/298.1, 222.4

See application file for complete search history.

(56) References Cited

U.S. PATENT DOCUMENTS

| 5,349,483 | A | 9/1994 | Tsai | 360/97.01 |
|---|---|---|---|---|
| 6,229,696 | B1 * | 5/2001 | Lin et al. | 361/683 |
| 6,272,009 | B1 * | 8/2001 | Buican et al. | 361/683 |
| 6,377,447 | B1 * | 4/2002 | Boe | 361/685 |
| 6,388,876 | B1 | 5/2002 | Chen | 361/685 |
| 6,456,489 | B1 * | 9/2002 | Davis et al. | 361/684 |
| 6,469,890 | B1 | 10/2002 | Gan | 361/685 |
| 6,956,737 | B2 * | 10/2005 | Chen et al. | 361/685 |
| 2005/0041388 | A1 * | 2/2005 | Erickson et al. | 361/685 |

FOREIGN PATENT DOCUMENTS

| TW | 482307 | | 4/2002 |
|---|---|---|---|
| TW | 09220157250 | * | 2/2003 |

* cited by examiner

*Primary Examiner*—Jayprakash Gandhi
*Assistant Examiner*—Zachary M Pape
(74) *Attorney, Agent, or Firm*—Morris Manning Martin LLP; Tim Tingkang Xia, Esq.

(57) ABSTRACT

A mounting mechanism includes a computer chassis (20), a bracket (30) defining a pair of slideways (341, 342) in a sidewall (34) thereof for receiving corresponding sliding members (12) of a storage device (10), a power supply (50) rotatably attached in the computer chassis, and a fastening piece (40) attached to the sidewall of the bracket. The fastening piece has a tilted portion (42), and a blocking portion (44). When the power supply is rotated inwardly, a retention member (56) of the power supply presses the tilted portion toward the sidewall, so that the blocking portion blocks the sliding member of the storage device in a corresponding slideway of the bracket. The storage device is thus secured in the bracket.

19 Claims, 4 Drawing Sheets

MOUNTING MECHANISM FOR STORAGE DEVICE

CROSS-REFERENCE TO RELATED APPLICATIONS

This application is related to a U.S. patent application Ser. No. 10/977,970, filed on Oct. 29, 2004, and now being granted as U.S. patent No. 7,079,382, entitled "MOUNTING MECHANISM FOR STORAGE DEVICE", assigned to the same assignee as the instant application and with the. The disclosure of the above identified application is incorporated herein by reference.

BACKGROUND OF THE INVENTION

1. Field of the Invention

The present invention relates to a mounting mechanism for storage device, and more particularly to a mounting mechanism which facilitates attachment of a storage device to a computer chassis.

2. Description of the Related Art

Computers have been widely used in modern life. It is desirable for a user or technician to conveniently access internal devices such as storage devices, expansion cards and Motherboard for purpose of service. However, storage devices, such as hard disk drives, compact disk read-only memory (CD-ROM) drives, digital video disc (DVD) drives, floppy disk drives, and the like are typically secured in computer chassis with screws or bolts. It is complicated and time-consuming to manipulate screws.

As disclosed in U.S. Pat. No. 5,349,483, a hard disk drive is firstly attached to a sliding box with screws, and the sliding box is inserted in a chamber on a computer chassis and releasably locked in place through tenon-and-mortise joints. It is boring to manipulate screws to detach the hard disk drive from the box when in need.

Taiwan Patent Application No. 89212419 teaches another hard disk drive mounting device. A mounting device included a support bracket and a securing plate. The hard disk drive is fixed to the support bracket with screws. The support bracket has a body with spring fingers for engaging computer chassis, and the securing plate has a base for engaging with the body of the support bracket. The securing plate includes a spring portion extending from one edge of the base for engaging the computer chassis, and a pulling portion with a slot defined therein extending from the opposite edge of the base. In spite of unduly complicated fixing structure, it is desired to reduce the use of screws.

SUMMARY OF THE INVENTION

Accordingly, an object of the present invention is to provide a mounting mechanism which facilitates the attachment of a storage device to a computer chassis.

Another object of the present invention is to provide a mounting mechanism which can simultaneously secure two internal devices to a computer chassis without use of screws.

To achieve the above objects, a mounting mechanism in accordance with the present invention comprises a computer chassis, a bracket defining a pair of slideways in a sidewall thereof for receiving corresponding sliding members of a storage device, a power supply rotatably attached in the computer chassis, and a fastening piece attached to the sidewall of the bracket. The fastening piece has a tilted portion, and a blocking portion. When the power supply is rotated inwardly, a retention member of the power supply presses the tilted portion toward the sidewall, so that the blocking portion blocks the sliding member of the storage device in a corresponding slideway of the bracket. The storage device is thus secured in the bracket.

Other objects, advantages and novel features of the present invention will be drawn from the following detailed description of preferred embodiments of the present invention with the attached drawings, in which:

DETAILED DESCRIPTION OF THE PRESENT INVENTION

Figure 1:
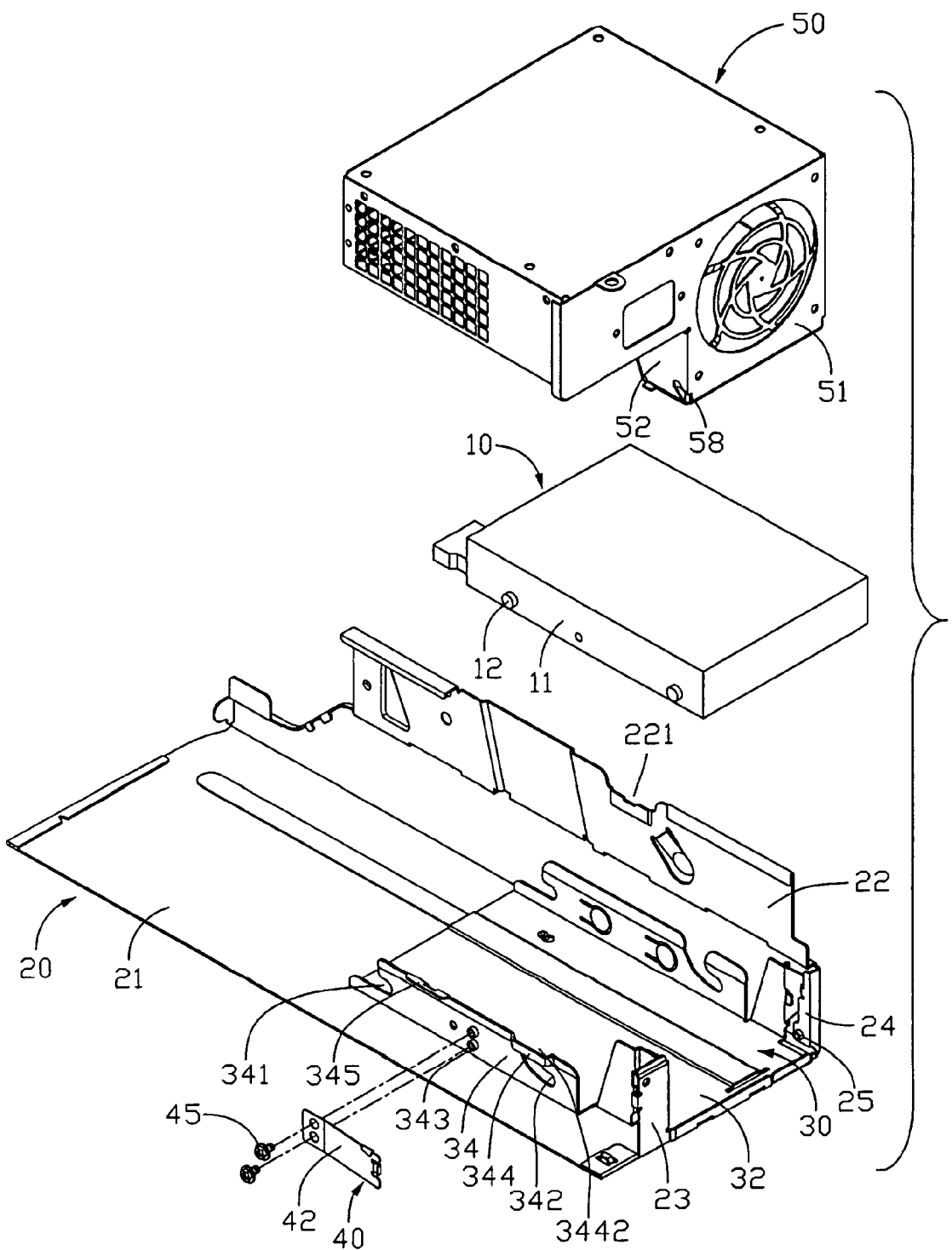
FIG. 1 is an exploded, isometric view of a mounting mechanism in accordance with a preferred embodiment of the present invention together with a storage device, the mounting mechanism comprising a computer chassis, a bracket, a fastening piece and a power supply.

Referring to FIG. 1, a mounting mechanism in accordance with the preferred embodiment of the present invention is provided for holding a storage device 10 in place in a chassis of an electronic device like a computer. The mounting mechanism comprises a bracket 30 attached to a computer chassis 20, a fastening piece 40, and an internal device such as a power supply 50.

The computer chassis 20 comprises a first wall 21 and a second wall 22 perpendicularly extended from a longitudinal edge of the first wall 21. A bent plate 23 is formed from a rear end of the first wall 21. A bent plate 24 is bent from a rear edge of the second wall 22. A pivot 25 is formed on a side face of the bent plate 24 at a lower portion thereof. Another pivot (not visible) is formed on a side face of the bent plate 23, corresponding to the pivot 25 of the second wall 22. A groove 221 is stamped inwardly adjoining a cutout at an upper portion of the second wall 22.

The bracket 30 comprises a bottom wall 32 supported on the first wall 21 of the chassis 20, and a pair of sidewalls 34 bent from opposite sides of the bottom wall 32. A horizontal slideway 341 is defined in a front end of each sidewall 34. An arcuate slideway 342 is defined in each sidewall 34 adjacent to a rear end thereof. A flange 345 is bent outwardly from an upper edge of the sidewall 34 adjacent to the slideway 341. A barrier strip 344 is stamped outwardly from the upper edge of the sidewall 34 proximal to the rear end, thereby defining an opening 3442 between the barrier strip 344 and the sidewall 34. Two protrusions 343 are formed from the sidewall 34 between the slideways 341, 342. Each protrusion 343 defines a threaded hole therein. A slot 3451 is defined in the flange 345; a cutout 346 is defined in a rear portion of each sidewall 34 (see FIG. 4).

The storage device 10 comprises a pair of sliding members 12 attached to each of opposite sidewalls 11, corresponding to the slideways 341, 342 of the bracket 30.

Figure 2:
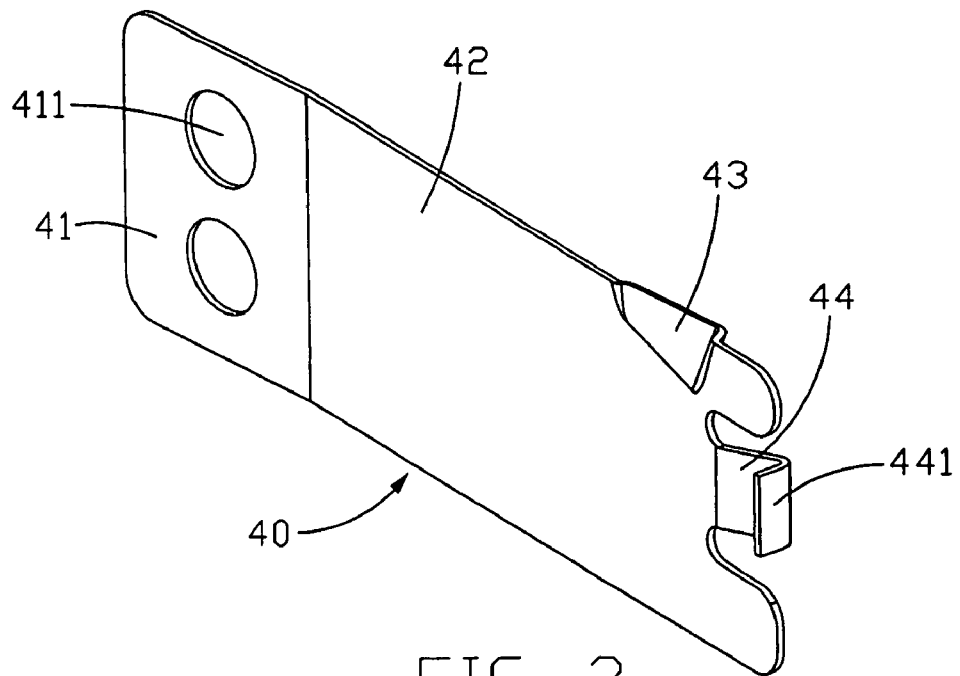
FIG. 2 is an enlarged view of the fastening piece shown in FIG. 1.

Referring to FIG. 2, the fastening piece 40 comprises a mounting portion 41, and a tilted portion 42 integrally extended from the mounting portion 41. Two through apertures 411 are defined in the mounting portion 41 corresponding to the protrusions 343 of the bracket 30. An upper edge of the tilted portion 42 is stamped to form a guiding portion 43. A distal end of the tilted portion 42 forms a V-shaped blocking portion 44. The blocking portion 44 comprises a blocking surface 441.

Figure 3:
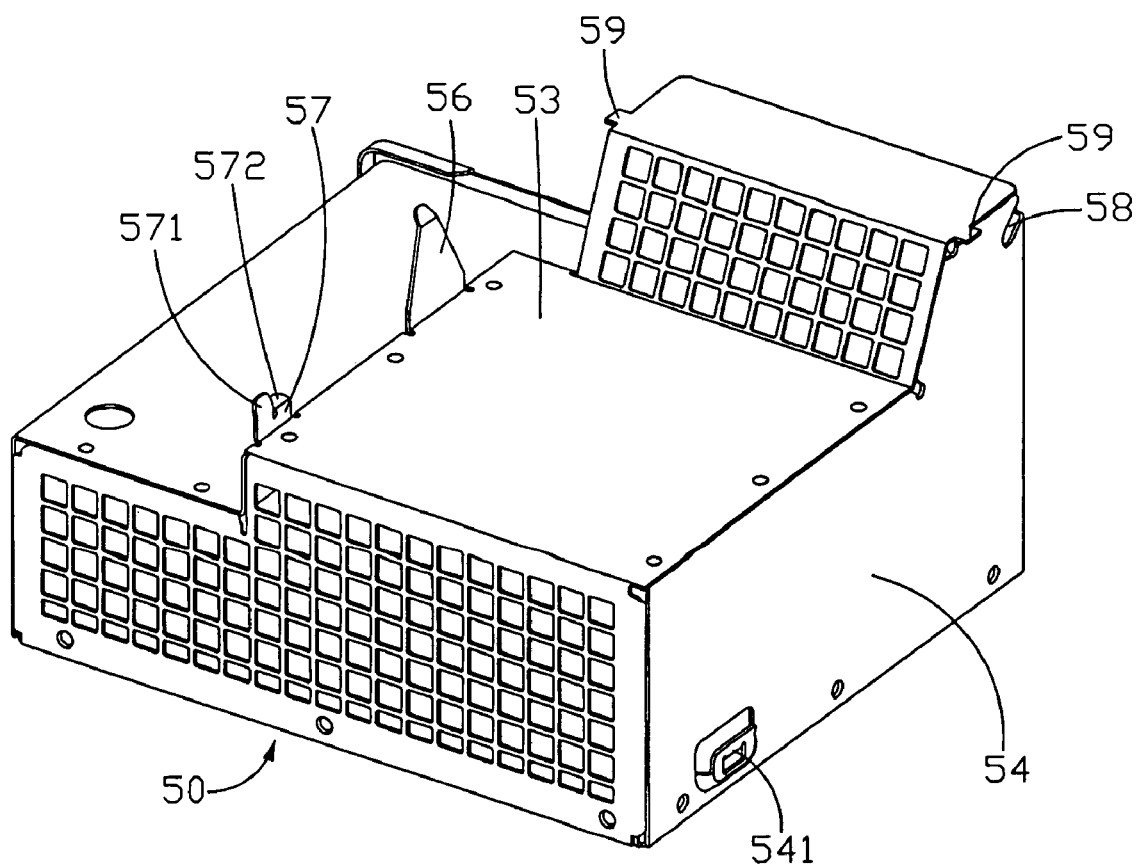
FIG. 3 is an enlarged view of the power supply shown in FIG. 1, but viewed from another aspect.

Referring also to FIG. 3, the power supply 50 comprises a rear plate 51, two parallel side plates 52, 54, and a bottom plate 53. A stopper member 57 is formed from a front end of an edge of the bottom plate 53 spacing from the side plate 54, corresponding to the flange 345 of the bracket 30, and a retention member 56 is slantingly outwardly formed from a rear end of the edge, corresponding to the barrier strip 344 of the bracket 30. The retention member 56 is a wedge-shaped plate. The stopper member 57 comprises a first tab 571, and a second tab 572. A pair of guideways 58 is defined in the side plates 52, 54 respectively adjacent to a lower edge of the rear plate 51, corresponding to the pivots 25 of the computer chassis 20. A pair of projections 59 is projected horizontally outwardly from opposite side edges of the side plates 52, 54 respectively. A catch 541 is formed on the side plate 54, corresponding to the groove 221 of the computer chassis 20.

In assembly of the mounting mechanism, the power supply 50 is attached to the computer chassis 20 with pivots 25 slidably and pivotally received in corresponding guideways 58 of the power supply 50. Two screws 45 extend through the through apertures 411 of the fastening piece 40 and engage in the protrusions 343 of the bracket 30 thereby attaching the fastening piece 40 to the bracket 30.

Figure 4:
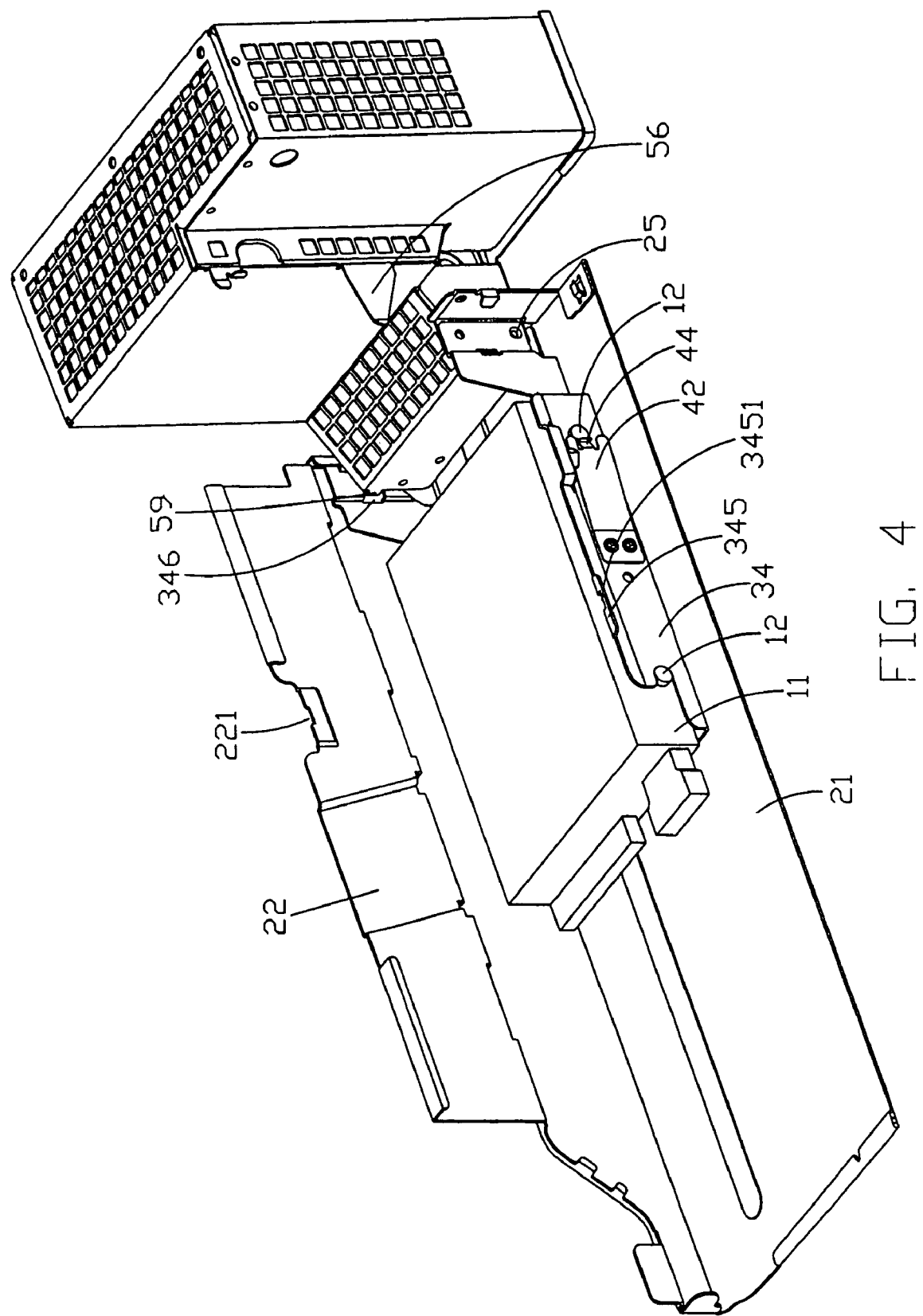
FIG. 4 is a pre-assembled view of FIG. 1, showing the storage device attached to the bracket and power supply rotatably attached to the chassis, but viewed from another aspect.
Figure 5:
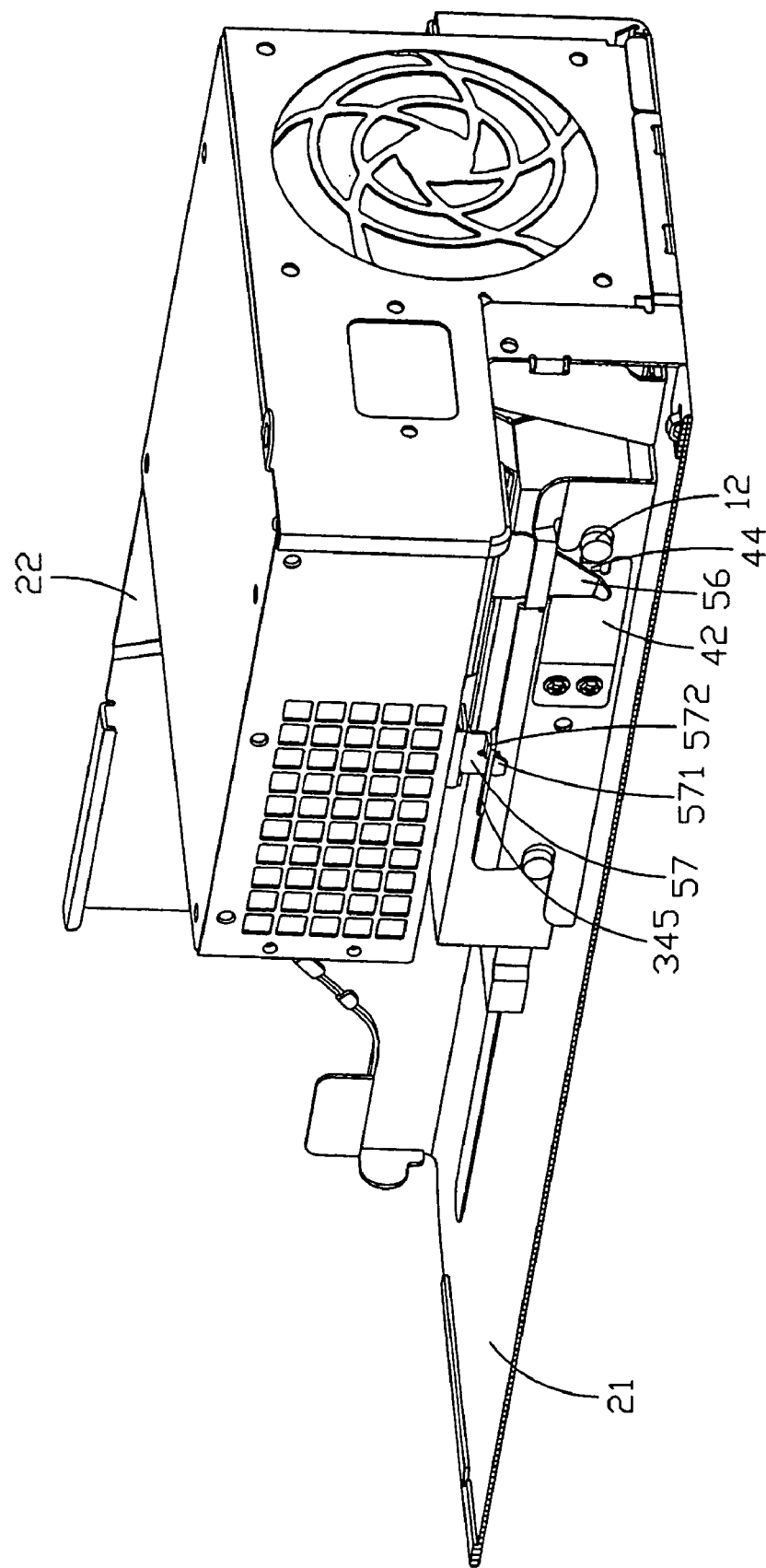
FIG. 5 is an assembled view of FIG. 1, showing the storage device fully attached to the bracket.

FIG. 4 shows the storage device 10 is positioned in the bracket 30, with sliding members 12 of the storage device 10 received in corresponding slideways 341, 342 of the bracket 30. The rear one of the sliding members 12 is located between the blocking surface 441 of the fastening piece 40 and an end of the slideway 342.

To secure the storage device 10 in the bracket 30, the power supply 50 is rotated inward the compute chassis 20. During the rotation of the power supply 50, the retention member 56 enters the opening 3442 of the bracket 30, and an inner surface of the retention member 56 abuts the guiding portion 43 of the fastening piece 40. When the power supply 50 is further rotated, the retention member 56 presses the tilted portion 42 of the fastening piece 40 inwardly, so that the tilted portion 42 becomes closer to the sidewall 34, and the blocking surface 441 of the blocking portion 44 abuts against a side surface of the rear one of the sliding members 12. The rear one of the sliding members 12 is thereby blocked between the end of the slideway 342 and the blocking surface 441 of the fastening piece 40. Continue to rotate the power supply 50, until the first tab 571 of the stopper member 57 enters the slot 3451 of the flange 345 of the bracket 30, and the second tab 572 of the stopper member 57 is supported on the flange 345. The catch 541 of the side plate 54 of the power supply 50 is supportingly received in the groove 221 of the chassis 20. At this time, the tilted portion 42 of the fastening piece 40 is close enough to the sidewall 34 of the bracket 30. The blocking surface 441 of the blocking portion 44 is securely abutting again the rear one of the sliding members 12 of the storage device 10. Thereby the storage device 10 is secured in the chassis 20.

To detach the storage device 10 from the bracket 30, the power supply 50 is rotated outwardly, until the projections 59 of the power supply 50 are blocked by the cutouts 346 of the bracket 30. The power supply 50 is thereby located outside the chassis 20. The retention member 56 leaves the tilted portion 42 of the fastening piece 40, so that the tilted portion 42 returns to its original position. The blocking surface 441 of the tilted portion 42 no longer abuts against the side surface of the sliding member 12. The storage device 10 is thus readily taken away from the bracket 30.

While the present invention has been illustrated by the description of the preferred embodiments thereof, and while the preferred embodiments have been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting mechanism for a storage device having at least one sliding member, comprising:
    a bracket for receiving the storage device therein, the bracket comprising a sidewall defining at least one slideway for receiving said sliding member of the storage device;
    a fastening piece attached to the sidewall of the bracket, the fastening piece comprising a tilted portion and a blocking portion formed at a free end of the tilted portion; and
    a retention member rotatable about an axis perpendicular to the sidewall of the bracket between a first position in which the retention member presses the tilted portion toward the sidewall of the bracket, so that the blocking portion blocks said sliding member with an end of said slideway, and a second position in which the retention member releases the tilted portion, so that the blocking portion unblocks said sliding member.

2. The mounting mechanism as claimed in claim 1, wherein said slideway communicates with an upper edge of the sidewall of the bracket.

3. The mounting mechanism as claimed in claim 1, wherein the blocking portion of the fastening piece is generally V-shaped, and comprises a blocking surface at a distal end thereof.

4. The mounting mechanism as claimed in claim 1, wherein a guiding portion is formed at an upper edge of the tilted portion and adjacent the blocking portion, the guiding portion is slanted for facilitating entry of the retention member.

5. The mounting mechanism as claimed in claim 4, wherein the retention member is wedge-shaped.

6. The mounting mechanism as claimed in claim 4, wherein a barrier strip is stamped outwardly from an upper edge of the sidewall corresponding to said slideway, thereby defining an opening between the baffler strip and the sidewall.

7. The mounting mechanism as claimed in claim 1, wherein further comprising a power supply, wherein the power supply is pivotally attached to the chassis, the retention member depends from the power supply.

8. A mounting mechanism for a storage device having at least one sliding member, comprising:
    a computer chassis;
    a bracket defining at least one slideway in a sidewall thereof for receiving said sliding member of the storage device;
    an internal device rotatably attached in the chassis, the internal device comprising a retention member; and a fastening piece attached to the sidewall of the bracket, the fastening piece comprises a blocking portion corresponding to said sliding member;

wherein the internal device is rotatable to a final position in which the retention member of the internal device pushes the blocking portion of the fastening piece for blocking said sliding member of the storage device in said slideway of the bracket, and the fastening piece is sandwiched between the retention member of the internal device and the sidewall of the bracket; and wherein a flange is bent from the sidewall of the bracket, a slot is defined in the flange, and a first tab is formed on the internal device to engage the slot of the flange.

9. The mounting mechanism as claimed in claim 8, wherein said slideway is arcuate.

10. The mounting mechanism as claimed in claim 8, wherein a second tab is formed on the internal device to be supported on the flange.

11. The mounting mechanism as claimed in claim 8, wherein a pair of bent plates is formed on the computer chassis, a pair of pivots is formed on the bent plates respectively, and the internal device is rotatable around the pivots.

12. The mounting mechanism as claimed in claim 11, wherein the internal device is a power supply.

13. The mounting mechanism as claimed in claim 8, wherein the retention member is wedge-shaped.

14. The mounting mechanism as claimed in claim 8, wherein the fastening piece comprises a tilted portion, the blocking portion is formed at a free end of the tilted portion, a guiding portion is formed at an upper edge of the tilted portion and adjacent the blocking portion, the guiding portion is slanted for facilitating entry of the retention member.

15. The mounting mechanism as claimed in claim 14, wherein the blocking portion is generally V-shaped, and comprises a blocking surface at a distal end thereof.

16. The mounting mechanism as claimed in claim 8, wherein a cutout is defined in the sidewall, a projection is formed from the internal device, when the internal device is rotated outwardly from the chassis, the projection is received in the cutout for preventing the internal device from further rotating.

17. The mounting mechanism as claimed in claim 8, wherein a groove is defined in a side plate of the chassis, a catch is formed at a side plate of the internal device for supportingly engaging in the groove.

18. A mounting mechanism for mounting a storage device in a chassis of an electronic device having an internal device installable next to said storage device, said mounting mechanism comprising:

a bracket installed in said chassis neighboring said internal device and adapted to slidably receive said storage device therein;

a fastening piece longitudinally attached to a sidewall of said bracket, and movable between a first position to be engagable with said storage device for securing said storage device in said bracket and a second position to be disengaged from said storage device for releasing said storage device; and a retention member attached to said internal device and rotatable together therewith, said retention member engagable with said fastening piece to urge said fastening piece to move from said second position thereof to said first position thereof when said internal device moves to a final position thereof in said chassis, said retention member being rotatable about an axis perpendicular to said sidewall of said bracket.

19. The mounting mechanism as claimed in claim 18, wherein said fastening piece is resilient and prone to move from said first position to said second position without engagement with said retention member.

\* \* \* \* \*